US010672559B2

(12) United States Patent
Inomata et al.

(10) Patent No.: US 10,672,559 B2
(45) Date of Patent: Jun. 2, 2020

(54) MULTILAYER CERAMIC CAPACITOR AND MANUFACTURING METHOD THEREOF

(71) Applicant: TAIYO YUDEN CO., LTD., Chuo-ku, Tokyo (JP)

(72) Inventors: Yasuyuki Inomata, Takasaki (JP); Yasuhisa Kono, Takasaki (JP); Mina Amano, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 16/044,834

(22) Filed: Jul. 25, 2018

(65) Prior Publication Data

US 2019/0035554 A1    Jan. 31, 2019

(30) Foreign Application Priority Data

Jul. 26, 2017    (JP) .................... 2017-144958

(51) Int. Cl.
*H01G 4/30*    (2006.01)
*H01G 4/12*    (2006.01)
(Continued)

(52) U.S. Cl.
CPC .......... *H01G 4/1227* (2013.01); *H01G 4/012* (2013.01); *H01G 4/12* (2013.01); *H01G 4/224* (2013.01);
(Continued)

(58) Field of Classification Search
CPC .......... H01G 4/005; H01G 4/08; H01G 4/012; H01G 4/12; H01G 4/30; H01G 4/248;
(Continued)

(56) References Cited

U.S. PATENT DOCUMENTS 9,812,260 B2 * 11/2017 Fukunaga ............... H01G 4/012
2014/0022692 A1 * 1/2014 Yoon ........................ H01G 4/12
361/301.4
(Continued)

FOREIGN PATENT DOCUMENTS

JP    H03108306 A    5/1991
JP    H08138968 A    5/1996
(Continued)

*Primary Examiner* — Nguyen T Ha
(74) *Attorney, Agent, or Firm* — Law Office of Katsuhiro Arai

(57) ABSTRACT

A multilayer ceramic capacitor includes: a multilayer structure in which each of a plurality of ceramic dielectric layers and each of a plurality of internal electrode layers are alternately stacked, the plurality of internal electrode layers being alternately exposed to a first edge face and a second edge face of the multilayer structure, wherein $1.5 \leq Db/Da \leq 10.0$ is satisfied in a side margin region that covers edge portions to which the plurality of internal electrode layers extend toward two side faces other than the first edge face and the second edge face, when Da is an average grain diameter of a main component ceramic within 20 μm from an edge of the plurality of internal electrode layers in the side margin region and Db is an average grain diameter of a main component ceramic within 20 μm from a surface layer of the side margin region.

5 Claims, 5 Drawing Sheets

(51) Int. Cl.
*H01G 4/012* (2006.01)
*H01G 4/224* (2006.01)
*H01G 4/248* (2006.01)

(52) U.S. Cl.
CPC ............... *H01G 4/30* (2013.01); *H01G 4/308* (2013.01); *H01G 4/248* (2013.01)

(58) Field of Classification Search
CPC ........ H01G 4/228; H01G 4/232; H01G 4/308; H01G 4/1227
See application file for complete search history.

(56) References Cited

U.S. PATENT DOCUMENTS

| 2015/0200055 | A1* | 7/2015 | Ishida | H01G 4/012 |
| | | | | 361/301.4 |
| 2016/0293331 | A1* | 10/2016 | Kitamura | H01G 4/30 |
| 2017/0243697 | A1* | 8/2017 | Mizuno | H01G 4/308 |

FOREIGN PATENT DOCUMENTS

| JP | 2004323315 A | 11/2004 |
| JP | 2014022721 A | 2/2014 |

\* cited by examiner

MULTILAYER CERAMIC CAPACITOR AND MANUFACTURING METHOD THEREOF

CROSS-REFERENCE TO RELATED APPLICATION

This application is based upon and claims the benefit of priority of the prior Japanese Patent Application No. 2017-144958, filed on Jul. 26, 2017, the entire contents of which are incorporated herein by reference.

FIELD

A certain aspect of the present invention relates to a multilayer ceramic capacitor and a manufacturing method thereof.

BACKGROUND

It is demanded that a multilayer ceramic capacitor is downsized and a capacity of the multilayer ceramic capacitor is enlarged. There are methods for enlarging the capacity without enlarging a size as follows. (1) A relative dielectric constant of a dielectric material is enlarged. (2) A thickness of dielectric layers is reduced. (3) The number of the dielectric layers is enlarged. (4) An area of effective intersection of a dielectric region (an area in which an internal electrode connected to an external electrode faces with another internal electrode connected to another external electrode) is enlarged. With the methods, it is possible to enlarge a capacity of a multilayer ceramic capacitor of which a rated voltage is small.

As an example, the multilayer ceramic capacitors are used as smoothing circuits. In the smoothing circuits, DC bias characteristic is important. This is because an effective capacity may decrease because of a DC component in a capacitor using a ferroelectric material (for example, see Japanese Patent Application Publication No. 2004-323315). When the effective capacity decreases, the capacitor is not effective for smoothing.

When a dielectric constant of a dielectric material is increased in accordance with the method (1), the bias characteristic is degraded. Therefore, the method (1) is not preferable in a capacitor used for smoothing. When the thickness of the dielectric layers is reduced in accordance with the method (2), electric field intensity applied between internal electrode layers increases and the bias characteristic is degraded. Therefore, the method (2) is not preferable. In the method (3), when the number of stacking is increased, a multilayer ceramic capacitor gets higher and a size of the capacitor is enlarged. Therefore, the method (4) is the most effective with respect to a multilayer ceramic capacitor in which enlargement of capacity (specifically effective capacity) is demanded without enlarging the size.

As a concrete method for enlarging the effective intersection area, slurry for forming a side margin region is coated, after stacking green sheets (for example, see Japanese Patent Application Publication No. H03-108306).

SUMMARY OF THE INVENTION

When a voltage is applied to the multilayer ceramic capacitor using a ferroelectric material, a capacity region expands in a stacking direction because of reverse voltage effect. On the other hand, a voltage is not applied to a side margin region. Therefore, a self-displacement does not occur in the side margin region. In this case, the side margin region is subjected to a tensile stress because a displacement occurs in the capacity region. Thus, a crack may occur in the side margin region because of the tensile stress, when the thickness of the side margin region is reduced in order to enlarge the capacity region. Therefore, breakdown may occur during a low voltage application. And reliability may be degraded.

The present invention has a purpose of providing a multilayer ceramic capacitor and a manufacturing method of the multilayer ceramic capacitor that are capable of suppressing a crack in a side margin region.

According to an aspect of the present invention, there is provided a multilayer ceramic capacitor including: a multilayer structure in which each of a plurality of ceramic dielectric layers and each of a plurality of internal electrode layers are alternately stacked, a main component of the plurality of dielectric layers being ceramic, the multilayer structure having a rectangular parallelepiped shape, the plurality of internal electrode layers being alternately exposed to a first edge face and a second edge face of the multilayer structure, the first edge face facing with the second edge face, wherein $1.5 \leq Db/Da \leq 10.0$ is satisfied in a side margin region that covers edge portions to which the plurality of internal electrode layers extend toward two side faces other than the first edge face and the second edge face, when Da is an average grain diameter of a main component ceramic within 20 μm from an edge of the plurality of internal electrode layers in the side margin region and Db is an average grain diameter of a main component ceramic within 20 μm from a surface layer of the side margin region.

According to an aspect of the present invention, there is provided a manufacturing method of a multilayer ceramic capacitor including: a first step of providing a pattern of a metal conductive paste on a green sheet including main component ceramic grains; a second step of obtaining a ceramic multilayer structure by stacking a plurality of lamination units obtained by the first step so that positions of the pattern are alternately shifted; and a third step of baking the ceramic multilayer structure and obtaining a multilayer structure in which each of a plurality of ceramic dielectric layers and each of a plurality of internal electrode layers are alternately stacked, the multilayer structure having a rectangular parallelepiped shape, the plurality of internal electrode layers being alternately exposed to a first edge face and a second edge face of the multilayer structure, the first edge face facing with the second edge face, wherein: in the third step, grain growth of a surface region of a side margin region is promoted more than grain growth of an inner region of the side margin region and thereby $1.5 \leq Db/Da \leq 10.0$ is satisfied in the side margin region when Da is an average grain diameter of a main component ceramic within 20 μm from an edge of the plurality of internal electrode layers in the side margin region and Db is an average grain diameter of the main component ceramic within 20 μm from a surface layer of the side margin region; and the side margin region is a region that covers edge portions to which the plurality of internal electrode layers extend toward two side faces other than the first edge face and the second edge face.

DETAILED DESCRIPTION

A description will be given of an embodiment with reference to the accompanying drawings.

Figure 1:
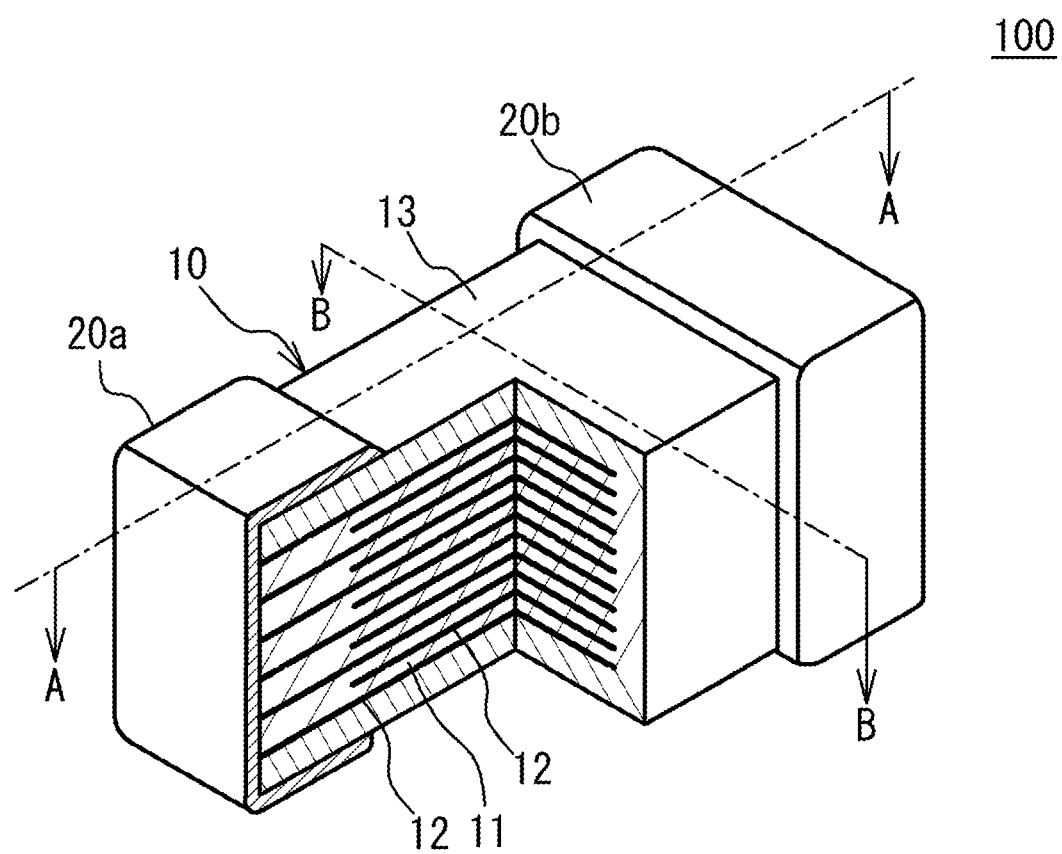
FIG. 1 illustrates a partial perspective view of a multilayer ceramic capacitor.
Figure 2:
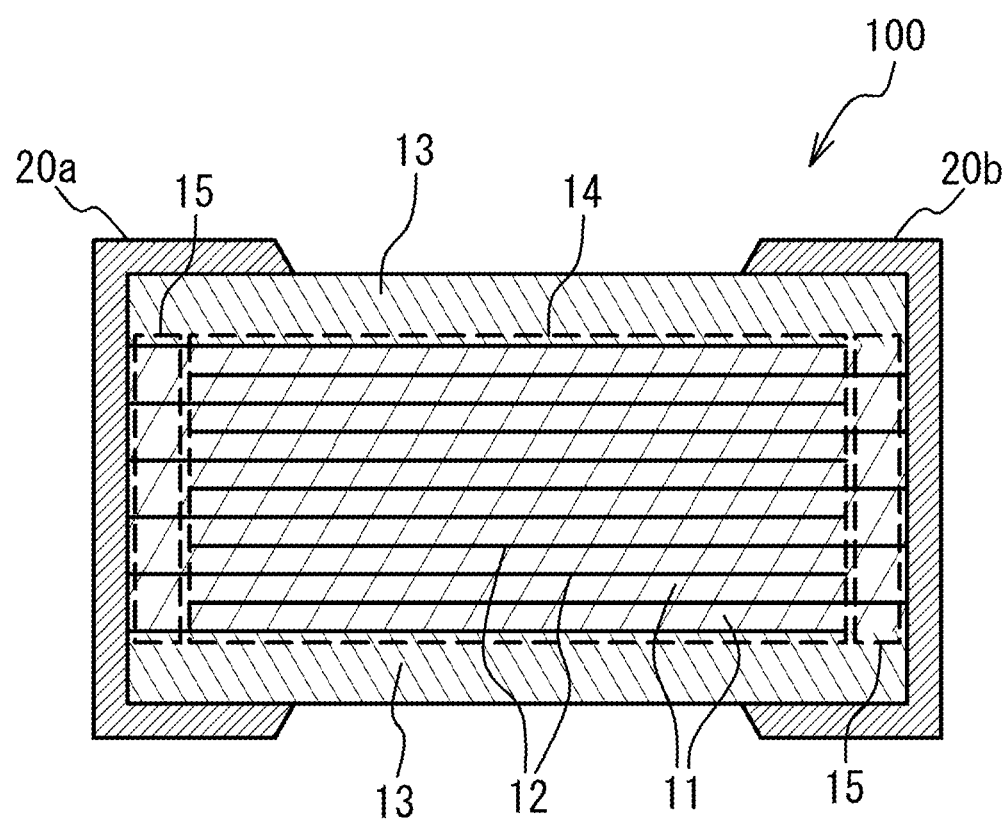
FIG. 2 illustrates a cross sectional view taken along a line A-A of FIG. 1.
Figure 3:
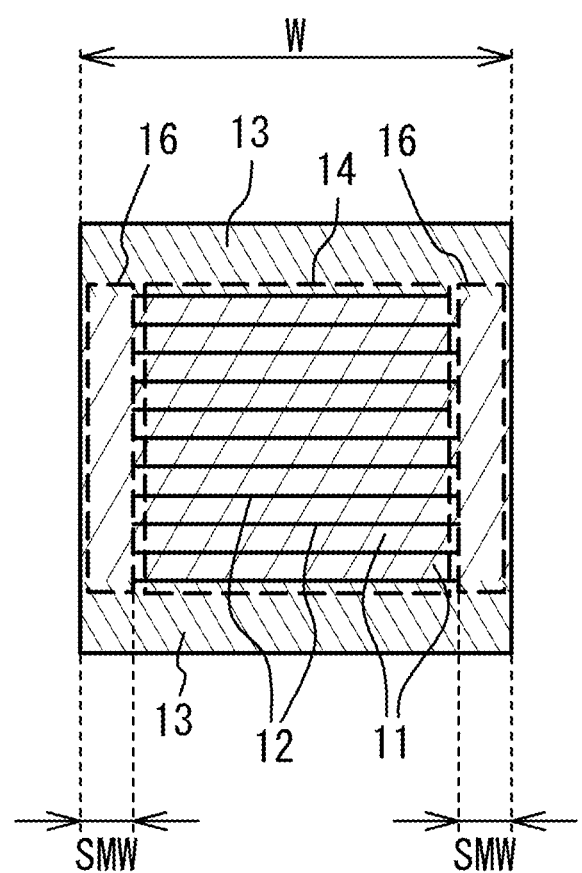
FIG. 3 illustrates a cross sectional view taken along a line B-B of FIG. 1.

(Embodiment) FIG. 1 illustrates a partial perspective view of a multilayer ceramic capacitor 100 in accordance with an embodiment. FIG. 2 illustrates a cross sectional view taken along a line A-A of FIG. 1. FIG. 3 illustrates a cross sectional view taken along a line B-B of FIG. 1. As illustrated in FIG. 1 to FIG. 3, the multilayer ceramic capacitor 100 includes a multilayer chip 10 having a rectangular parallelepiped shape, and a pair of external electrodes 20a and 20b that are respectively provided at two edge faces of the multilayer chip 10 facing each other. In four faces other than the two edge faces of the multilayer chip 10, two faces other than an upper face and a lower face of the multilayer chip 10 in a stacking direction are referred to as side faces. The external electrodes 20a and 20b extend to the upper face, the lower face and the two side faces of the multilayer chip 10. However, the external electrodes 20a and 20b are spaced from each other.

The multilayer chip 10 has a structure designed to have dielectric layers 11 and internal electrode layers 12 alternately stacked. The dielectric layer 11 includes ceramic material acting as a dielectric material. The internal electrode layers 12 include a base metal material. End edges of the internal electrode layers 12 are alternately exposed to a first edge face of the multilayer chip 10 and a second edge face of the multilayer chip 10 that is different from the first edge face. In the embodiment, the first face faces with the second face. The external electrode 20a is provided on the first edge face. The external electrode 20b is provided on the second edge face. Thus, the internal electrode layers 12 are alternately conducted to the external electrode 20a and the external electrode 20b. Thus, the multilayer ceramic capacitor 100 has a structure in which a plurality of dielectric layers 11 are stacked and each two of the dielectric layers 11 sandwich the internal electrode layer 12. In the multilayer chip 10, the internal electrode layer 12 is positioned at an outermost layer. The upper face and the lower face of the multilayer chip 10 that are the internal electrode layers 12 are covered by cover layers 13. A main component of the cover layer 13 is a ceramic material. For example, a main component of the cover layer 13 is the same as that of the dielectric layer 11.

For example, the multilayer ceramic capacitor 100 may have a length of 0.2 mm, a width of 0.125 mm and a height of 0.125 mm. The multilayer ceramic capacitor 100 may have a length of 0.4 mm, a width of 0.2 mm and a height of 0.2 mm. The multilayer ceramic capacitor 100 may have a length of 0.6 mm, a width of 0.3 mm and a height of 0.3 mm. The multilayer ceramic capacitor 100 may have a length of 1.0 mm, a width of 0.5 mm and a height of 0.5 mm. The multilayer ceramic capacitor 100 may have a length of 3.2 mm, a width of 1.6 mm and a height of 1.6 mm. The multilayer ceramic capacitor 100 may have a length of 4.5 mm, a width of 3.2 mm and a height of 2.5 mm. However, the size of the multilayer ceramic capacitor 100 is not limited.

A main component of the internal electrode layers 12 is a base metal such as nickel (Ni), copper (Cu), tin (Sn) or the like. The internal electrode layers 12 may be made of a noble metal such as platinum (Pt), palladium (Pd), silver (Ag), gold (Au) or alloy thereof. The dielectric layers 11 are mainly composed of a ceramic material that is expressed by a general formula $ABO_3$ and has a perovskite structure. The perovskite structure includes $ABO_{3-\alpha}$ having an off-stoichiometric composition. For example, the ceramic material is such as $BaTiO_3$ (barium titanate), $CaZrO_3$ (calcium zirconate), $CaTiO_3$ (calcium titanate), $SrTiO_3$ (strontium titanate), $Ba_{1-x-y}Ca_xSr_yTi_{1-z}Zr_zO_3$ ($0 \leq x \leq 1$, $0 \leq y \leq 1$, $0 \leq z \leq 1$) having a perovskite structure.

As illustrated in FIG. 2, a region, in which a set of the internal electrode layers 12 connected to the external electrode 20a face another set of the internal electrode layers 12 connected to the external electrode 20b, is a region generating electrical capacity in the multilayer ceramic capacitor 100. And so, the region is referred to as a capacity region 14. That is, the capacity region 14 is a region in which the internal electrode layers 12 next to each other are connected to different external electrodes face each other.

A region, in which the internal electrode layers 12 connected to the external electrode 20a face with each other without sandwiching the internal electrode layer 12 connected to the external electrode 20b, is referred to as an end margin region 15. A region, in which the internal electrode layers 12 connected to the external electrode 20b face with each other without sandwiching the internal electrode layer 12 connected to the external electrode 20a is another end margin region 15. That is, the end margin region 15 is a region in which a set of the internal electrode layers 12 connected to one external electrode face with each other without sandwiching the internal electrode layer 12 connected to the other external electrode. The end margin region 15 is a region that does not generate electrical capacity in the multilayer ceramic capacitor 100.

As illustrated in FIG. 3, a region of the multilayer chip 10 from the two sides thereof to the internal electrode layers 12 is referred to as a side margin region 16. That is, the side margin region 16 is a region covering edges of the stacked internal electrode layers 12 in the extension direction toward the two side faces. The side margin region 16 does not generate electrical capacity. A thickness of the side margin region 16 (a distance from the side face of the multilayer chip 10 to the internal electrode layers 12) is 40 μm or more and 100 μm or less. A width W of the multilayer ceramic capacitor 100 (a distance between the two side faces of the multilayer chip 10) is 1.3 mm or more and 1.9 mm or less.

When a voltage is applied between the external electrode 20a and the external electrode 20b so that a voltage difference occurs between the external electrode 20a and the external electrode 20b, it is possible to use the multilayer ceramic capacitor 100 as a capacitor. The dielectric material expands in a voltage application direction because of a reverse voltage effect when a voltage is applied to the dielectric material. Therefore, when a voltage is applied to the multilayer ceramic capacitor 100, the dielectric layers 11 in the capacity region 14 expand in the stacking direction. On the other hand, a voltage is not applied to the dielectric layers 11 in the side margin region 16. Therefore, a self-displacement does not occur in the side margin region 16. In this case, the side margin region 16 is subjected to a tensile stress. Thus, a crack may occur in the side margin region 16. In particular, when the thickness of the side margin region 16 is reduced in order to enlarge the capacity region 14, a crack may easily occur.

And so, in the embodiment, an average grain diameter of main component ceramic grains near a surface layer of the side margin region 16 is larger than an average grain diameter of the main component ceramic grains in the side margin region 16 near the internal electrode layers 12. With the structure, even if a tensile stress occurs in the capacity region 14 during the voltage application, the crack is suppressed in the side margin region 16. It is therefore possible to improve the breakdown voltage. It is thought that the reason is the side margin region 16 has an inner compressive stress so that the tensile stress occurring in the capacity region 14 during the voltage application is canceled. In other words, it is thought that the inner compressive stress occurs in the side margin region 16 so that the tensile stress occurring in the capacity region 14 during the voltage application is canceled, because the average grain diameter of the main component ceramic grains near the surface layer of the side margin region 16 is larger than the average grain diameter of the main component ceramic grains in the side margin region 16 near the internal electrode layers 12. When the crack of the side margin region 16 is suppressed, strength needed for the side margin region 16 is reduced. It is therefore possible to reduce a thickness of the side margin region 16. Therefore, a volume ratio of the capacity region 14 in the multilayer ceramic capacitor 100 gets higher, and a large capacity is achieved.

Figure 4:
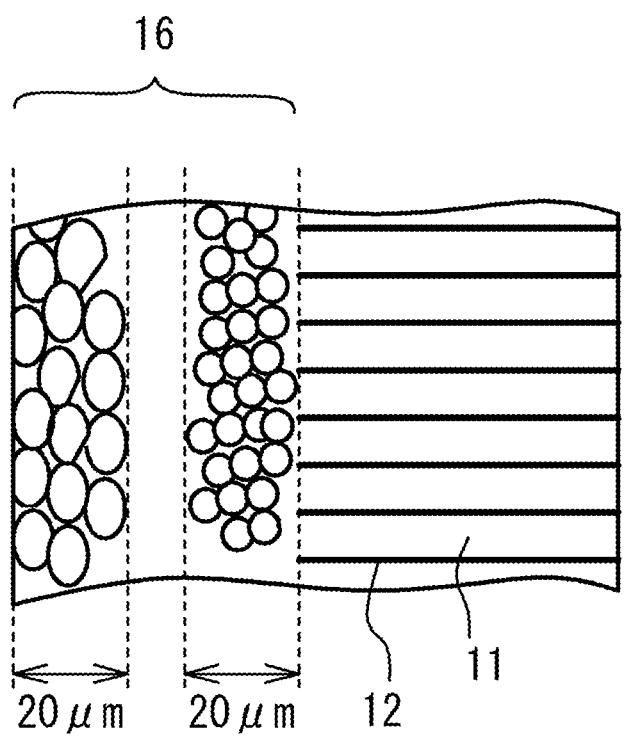
FIG. 4 illustrates an enlarged cross sectional view of a side margin region.

It is confirmed that the effect of the canceling of the tensile stress gets smaller when the difference of the average grain diameters get smaller. And so, in the embodiment, the difference of the average grain diameters has a lower limit. In concrete, as illustrated in FIG. 4, $1.5 \leq Db/Da$ is satisfied when an average grain diameter of the main component ceramic within 20 μm from the edge of the internal electrode layers 12 in the side margin region 16 is Da and an average grain diameter of the main component ceramic within 20 μm from the surface layer of the side margin region 16 is Db. Thus, it is possible to sufficiently achieve the effect of the canceling of the tensile stress. It is preferable that Db/Da is 2 or more, in order to sufficiently cancel the tensile stress.

On the other hand, when the difference of the average grain diameters is excessively large, a crack may occur in the side margin region 16 before applying a voltage. It is thought that this is because the inner compressive stress is excessively large in the side margin region 16. And so, in the embodiment, the difference of the average grain diameters has an upper limit. In concrete, $Db/Da \leq 10.0$ is satisfied. Thus, excessive enlargement of the inner compressive stress is suppressed in the side margin region 16, and the occurrence of the crack is suppressed in the side margin region 16 before the voltage application. It is preferable that Db/Da is 8 or less, in order to suppress the inner compressive stress.

In order to cancel the tensile stress and suppress excessive inner compressive stress, it is preferable that the average grain diameter Da is 100 nm or more and 300 nm or less, and it is more preferable that the average grain diameter Da is 120 nm or more and 200 nm or less. It is preferable that the average grain diameter Db is 150 nm or more and 3000 nm or less, and it is more preferable that the average grain diameter Db is 180 nm or more and 2000 nm or less.

It is preferable that an average grain diameter of a main component ceramic in the dielectric layers 11 in the capacity region 14 is 50 nm or more and 300 nm or less. In this case, the average grain diameter Da is closer to the average grain diameter of the capacity region 14 than the average grain diameter Db is. It is therefore possible to reduce a difference between the average grain diameter Db and the average grain diameter of the capacity region 14 and suppress the occurrence of the crack.

Figure 5:
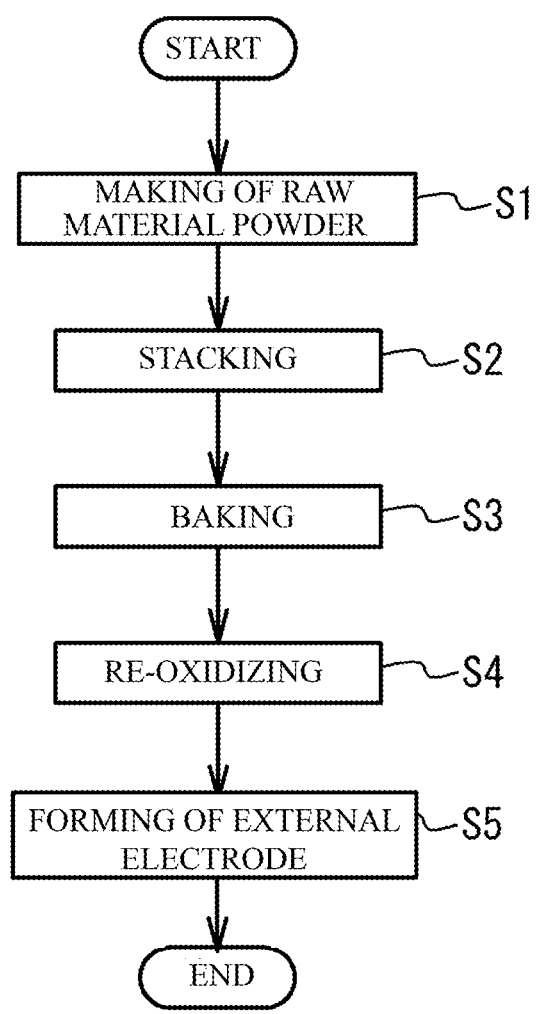
FIG. 5 illustrates a flow of a manufacturing method of a multilayer ceramic.

Next, a description will be given of a manufacturing method of the multilayer ceramic capacitor 100. FIG. 5 illustrates a manufacturing method of the multilayer ceramic capacitor 100.

(Making process of raw material powder) A raw material powder for forming the dielectric layer 11 is prepared. Generally, an A site element and a B site element are included in the dielectric layer 11 in a sintered phase of grains of $BaTiO_3$. For example, $BaTiO_3$ is tetragonal compound having a perovskite structure and has a high dielectric constant. Generally, $BaTiO_3$ is obtained by reacting a titanium material such as titanium dioxide with a barium material such as barium carbonate and synthesizing barium titanate. Various methods can be used as a synthesizing method of the ceramic structuring the dielectric layer 11. For example, a solid-phase method, a sol-gel method, a hydrothermal method or the like can be used. The embodiment may use any of these methods.

Additive compound may be added to the resulting ceramic material powder in accordance with purposes. The additive compound may be an oxide of Mg (magnesium), Mo (molybdenum), Mn (manganese), V (vanadium), Cr (chromium) or a rare earth element (Y (yttrium), Sm (samarium), Eu (europium), Gd (gadolinium), Tb (terbium), Dy (dysprosium), Ho (holmium), Er (erbium), Tm (thulium) and Yb (ytterbium)), or an oxide of Co (cobalt), Ni, Zn (zinc), Li (lithium), B (boron), Na (sodium), K (potassium) and Si, or glass.

In the embodiment, it is preferable that ceramic particles structuring the dielectric layer 11 are mixed with compound including additives and are calcined in a temperature range from 820 degrees C. to 1150 degrees C. Next, the resulting ceramic particles are wet-blended with additives and are dried and crushed. Thus, a ceramic powder is obtained. For example, it is preferable that an average grain diameter of the resulting ceramic powders is 50 nm to 300 nm from a viewpoint of thickness reduction of the dielectric layer 11. For example, the grain diameter may be adjusted by crushing the resulting ceramic powder as needed. Alternatively, the grain diameter of the resulting ceramic power may be adjusted by combining the crushing and classifying.

In the embodiment, it is preferable that the dielectric material has a tendency toward the grain growth. And so, it is preferable that the total concentration of Mg and Mn in the dielectric material is 0.3 atm % or less. There may be a case where one of Mg and Mn is not included. When Cr, Co, Ni and Zn are doped, it is preferable that the total concentration of Mg, Mn and these elements is 0.3 atm % or less. The concentration (atm %) is a concentration in a case where B site of the main component ceramic of a perovskite expressed by $ABO_3$ is 100 atm %.

(Stacking process) Next, a binder such as polyvinyl butyral (PVB) resin, an organic solvent such as ethanol or toluene, and a plasticizer such as dioctyl phthalate (DOP) are added to the resulting dielectric material and wet-blended. With use of the resulting slurry, a stripe-shaped dielectric green sheet with a thickness of 0.8 μm or less is coated on a base material by, for example, a die coater method or a doctor blade method, and then dried.

Then, a pattern of the internal electrode layer 12 is provided on the surface of the dielectric green sheet by printing a conductive paste for forming an internal electrode with use of screen printing or gravure printing. The conductive paste includes an organic binder. A plurality of patterns are alternatively exposed to the pair of external electrodes. The metal conductive paste includes ceramic particles as a co-material. A main component of the ceramic particles is not limited. However, it is preferable that the main component of the ceramic particles is the same as that of the dielectric layer 11. For example, $BaTiO_3$ of which an average particle sire is 50 nm or less is evenly dispersed. The metal conductive paste includes Ni or Ni alloy that suppresses the grain growth of the dielectric material. When Cu, Ag (silver), Pd (palladium) or an alloy thereof is used, a component suppressing the grain growth may be included. For example, Mg, Mn, Cr, Co, Ni, Zn or a conjugated compound.

Then, the dielectric green sheet on which the internal electrode layer pattern is printed is stamped into a predetermined size, and a predetermined number (for example, 100 to 500) of stamped dielectric green sheets are stacked while the base material is peeled so that the internal electrode layers 12 and the dielectric layers 11 are alternated with each other and the end edges of the internal electrode layers 12 are alternately exposed to both edge faces in the length direction of the dielectric layer so as to be alternately led out to a pair of external electrodes of different polarizations. Cover sheets, which are to be the cover layers 13, are compressed on the stacked dielectric green sheets and under the stacked dielectric green sheets. The resulting multilayer structure is cut into a predetermined size (for example, 3.5 mm×1.8 mm).

(Baking process) The binder is removed from the resulting compact in $N_2$ atmosphere of a temperature range of 250 degrees C. to 500 degrees C. After that, the resulting compact is baked for ten minutes to 2 hours in a reductive atmosphere of which an oxygen partial pressure is $10^{-5}$ to $10^{-8}$ atm in a temperature range of 1100 degrees C. to 1300 degrees C. Thus, each compound of the dielectric green sheet is sintered and grown into grains. In this manner, it is possible to manufacture the multilayer ceramic capacitor 100.

(Re-oxidizing process) After that, a re-oxidizing process may be performed in $N_2$ gas atmosphere in a temperature range of 600 degrees C. to 1000 degrees C. (Forming process of external electrodes) Cu paste is coated on both edge faces of the sintered structure and is fired. After that, by a plating process, the external electrodes 20a and 20b are formed.

In the manufacturing method in accordance with the embodiment, the dielectric material has a composition having a tendency toward grain growth, and the metal conductive paste has a component for suppressing the grain growth of the dielectric material. In this case, in the side margin region 16, the grain growth of the main component ceramic grains near the internal electrode layers 12 is suppressed. It is therefore possible to promote the grain growth of the main component ceramic grains near the surface layer. Thus, even if the tensile stress occurs in the capacity region 14 during applying of a voltage, a crack in the side margin region 16 is suppressed. Thereby, it is possible to improve the breakdown voltage. It is thought that the reason is that an inner compressive stress occurs in the side margin region 16 so that tensile stress of the capacity region 14 occurred by the voltage applying is canceled. In other words, it is thought that the inner compressive stress occurs in the side margin region 16 so that the tensile stress of the capacity region 14 occurring in the capacity region 14 during applying of the voltage is canceled, because the grain growth of the main component ceramic grains near the internal electrode layers 12 is suppressed and the grain growth of the main component ceramic grains near the surface layer is promoted. When the crack of the side margin region 16 is suppressed, strength needed for the side margin region 16 is reduced. It is therefore possible to reduce a thickness of the side margin region 16. Therefore, a volume ratio of the capacity region 14 in the multilayer ceramic capacitor 100 gets higher, and a large capacity is achieved. In the embodiment, $1.5 \leq Db/Da \leq 10.0$ is satisfied by adjusting the amount of the component suppressing the grain growth.

When the average grain diameter Da is closer to the average grain diameter of the capacity region 14 than the average grain diameter Db is, the difference between the average grain diameter Db and the average grain diameter of the capacity region 14 is reduced. Therefore, the occurrence of the crack is suppressed.

When grains near the surface layer of the side margin region 16 are grown, the number of pores in the main component ceramic is reduced. It is therefore possible to improve humidity resistance.

(Modified embodiment 1) In the above-mentioned manufacturing method, the dielectric material has a composition having a tendency toward the grain growth, and the metal conductive paste includes a component suppressing the grain growth of the dielectric material. However, the method is not limited. For example, a component (for example, anyone of Mg, Mn, Cr, Co, Ni and Zn, or a conjugated compound) suppressing the grain growth is doped to the dielectric material, and the multilayer structure is obtained in the stacking process. After that, an additive for promoting the grain growth may be coated on the surface layer of a region corresponding to the side margin region 16 and may be impregnated into the surface layer. In this case, the surface layer can achieve the grain growth during the baking. A glass component including $SiO_2$ or the like may be used as the additive for promoting the grain growth.

(Modified embodiment 2) Alternatively, after the baking, another baking may be performed after an atmosphere, an atmospheric pressure, a temperature or the like is changed. In this manner, the grain growth of the surface layer of the region corresponding to the side margin region 16 is promoted. For example, an oxygen partial pressure may be increased more than an oxygen partial pressure of the previous baking process. The method may be combined with any one of the above-mentioned manufacturing methods.

(Modified embodiment 3). Alternatively, a component (for example, any one of Mg, Mn, Cr, Co, Ni and Zn, or a conjugated compound) suppressing the grain growth may be doped to the dielectric material. After obtaining of the multilayer structure in the stacking process, slurry including another dielectric material including a composition (for example, the total concentration of Mg and Mn is 0.3 atm % or less) having a tendency toward the grain growth in the region corresponding to the side margin region 16 may be coated.

EXAMPLES

The multilayer ceramic capacitors in accordance with the embodiment were made. And, property of the multilayer ceramic capacitors was measured.

$BaTiO_3$ having an average grain diameter of 150 nm and including additives was prepared. As shown in Table 1, in examples 1 to 9, a total concentration of Mn and Mg was 0.3 atm % or less. In the examples 1, 3 and 4, the total concentration of Mn and Mg was 0.3 atm %. In the examples 2 and 5, the total concentration of Mn and Mg was 0.2 atm %. In the examples 6 to 8, the total concentration of Mn and Mg was 0.1 atm %. In the example 9, the total concentration of Mn and Mg was 0.05 atm %.

TABLE 1

| | BAKING TEMPERATURE (° C.) | TOTAL OF Mn & Mg (atm %) | AVERAGE GRAIN DIAMETER (nm) | | | DC VOLTAGE TOLERANCE TEST |
|---|---|---|---|---|---|---|
| | | | Da | Db | Db/Da | |
| EXAMPLE 1 | 1220 | 0.3 | 150 | 225 | 1.50 | Δ |
| EXAMPLE 2 | 1220 | 0.2 | 151 | 280 | 1.85 | Δ |
| EXAMPLE 3 | 1225 | 0.3 | 149 | 301 | 2.02 | ○ |
| EXAMPLE 4 | 1230 | 0.3 | 150 | 378 | 2.52 | ○ |
| EXAMPLE 5 | 1230 | 0.2 | 148 | 668 | 4.51 | ○ |
| EXAMPLE 6 | 1220 | 0.1 | 145 | 1080 | 7.45 | ○ |
| EXAMPLE 7 | 1225 | 0.1 | 147 | 1175 | 7.99 | ○ |
| EXAMPLE 8 | 1230 | 0.1 | 148 | 1300 | 8.78 | Δ |
| EXAMPLE 9 | 1230 | 0.05 | 150 | 1500 | 10.00 | Δ |
| COMPARATIVE EXAMPLE 1 | 1250 | 1.0 | 160 | 161 | 1.01 | NG |
| COMPARATIVE EXAMPLE 2 | 1220 | 0.5 | 154 | 210 | 1.36 | NG |
| COMPARATIVE EXAMPLE 3 | 1250 | 0.1 | 155 | 1900 | 12.26 | — |

In comparative examples 1 and 2, the total concentration of Mn and Mg was more than 0.3 atm %. In the comparative example 1, the total concentration of Mn and Mg was 1.0 atm %. In the comparative example 2, the total concentration of Mn and Mg was 0.5 atm %. In the comparative example 3, the total concentration of Mn and Mg was 0.1 atm %.

Butyral acting as an organic binder, and toluene and ethyl alcohol acting as a solvent were added to the dielectric material. A dielectric green sheet was formed by a doctor blade method so that the thickness of the dielectric layers 11 became 5 μm. A conductive paste for forming an internal electrode was screen-printed on the resulting dielectric sheet. A main component of the metal conductive paste was Ni for suppressing the grain growth. The resulting dielectric sheet was cut into a predetermined size. 170 numbers of sheets on which the conductive paste for forming an internal electrode were stacked. Cover sheets were stacked on a lower face and an upper face of the stacked sheets. After that, a multilayer structure was obtained by a thermo compression bonding. And the resulting multilayer structure was cut into a predetermined shape. After removing the binder in a $N_2$ atmosphere, the resulting multilayer structure was baked in a temperature range of 1220 degrees C. to 1250 degrees C. in a reductive atmosphere ($O_2$ partial pressure: $10^{-5}$ to $10^{-8}$ atm). And sintered multilayer structure was formed. In the examples 1, 2 and 6 and the comparative example 2, the baking temperature was 1220 degrees C. In the examples 3 and 7, the baking temperature was 1225 degrees C. In the examples 4, 5, 8 and 9, the baking temperature was 1230 degrees C. In the comparative examples 1 and 3, the baking temperature was 1250 degrees C. After re-oxidation of the sintered structure in $N_2$ atmosphere, Cu paste was coated on both edge faces and was fired. And a plating was performed. And a multilayer ceramic capacitor having a length of 3.2 mm, a width of 1.6 mm and a height of 1.6 mm was obtained.

(Analysis) In the examples 1 to 9, the dielectric material had a composition having a tendency toward grain growth, and a main component of the metal conductive paste for forming the internal electrode layers was Ni. It was therefore possible to suppress enlargement of the average grain diameter Da and enlarge the average grain diameter Db. As shown in Table 1, when the total concentration of Mn and Mg got smaller, the average grain diameter Db got larger. In the comparative examples 1 and 2, enlargement of the average grain diameter Db was suppressed. It is thought this was because the total concentration of Mn and Mg in the dielectric material amount was more than 0.3 atm % and the grain growth was suppressed. A surface was polished, and after that, the surface was subjected to a chemical etching. And the surface was observed with use of SEM (30 thousand magnifications). Grain diameters of approximately 500 numbers of grains were measured, and an average was calculated as the average grain diameter.

A DC voltage tolerance test was performed with respect to the multilayer ceramic capacitors of the examples 1 to 9 and the comparative examples 1 and 2. A charging current of 50 mA or less was maintained, and a voltage was increased. A maximum voltage of 500V was applied for 60 seconds. During the test, an insulation breakdown and appearance defect were confirmed. The test was repeated 20 times. The number of the abnormality was counted. When the number was 0, it was determined as "circle" indicating very good. When the number was 1 to 3, it was determined as "triangle" indicating not very good. When the number was 4 or more, it was determined as NG As shown in Table 1, in the examples 3 to 7, it was determined as circle. In the examples 1, 2, 8 and 9, it was determined as triangle. It is thought that this was because $1.5 \leq Db/Da \leq 10.0$ was satisfied, the tensile stress occurring in the capacity region 14 during applying voltage was canceled by inner compressive stress in the side margin region 16, and the crack of the side margin region 16 was suppressed.

On the other hand, in the comparative examples 1 and 2, abnormality occurred in the DC voltage tolerance test. It is thought that this was because Db/Da was less than 1.5 and the effect of canceling of the tensile stress was small. In the comparative example 3, a crack occurred in the side margin region 16 before the DC voltage tolerance test. Therefore, it was not possible to perform the DC voltage tolerance test with respect to the comparative example 3. It is thought this was because Db/Da was more than 10.0, the difference of the average grain diameters was excessively large, and the inner compressive stress in the surface layer of the side margin region 16 was excessively large.

Accordingly, when $1.5 \leq Db/Da \leq 10.0$ is satisfied, the crack of the side margin region 16 is suppressed.

Although the embodiments of the present invention have been described in detail, it is to be understood that the various change, substitutions, and alterations could be made hereto without departing from the spirit and scope of the invention.

What is claimed is:

1. A multilayer ceramic capacitor comprising:
a multilayer structure in which each of a plurality of ceramic dielectric layers and each of a plurality of internal electrode layers are alternately stacked, a main component of the plurality of dielectric layers being ceramic, the multilayer structure having a rectangular parallelepiped shape, the plurality of internal electrode layers being alternately exposed to a first edge face and a second edge face of the multilayer structure, the first edge face facing with the second edge face,
wherein
$1.5 \leq Db/Da \leq 10.0$ is satisfied in a side margin region that covers edge portions to which the plurality of internal electrode layers extend toward two side faces of the multilayer structure other than the first edge face and the second edge face, when Da is an average grain diameter of a main component ceramic within 20 μm from an edge of the plurality of internal electrode layers in the side margin region in an extending direction of the plurality of internal electrode layers which extend, respectively, toward the side margin region and Db is an average grain diameter of a main component ceramic within 20 μm from a surface layer of the side margin region in the extending direction.

2. The multilayer ceramic capacitor as claimed in claim 1, wherein the main component ceramic of the side margin region is barium titanate.

3. The multilayer ceramic capacitor as claimed in claim 2, wherein the side margin region includes Mn and/or Mg, and
wherein a total concentration of Mn and Mg in the side margin region is 0.3 atm % or less.

4. The multilayer ceramic capacitor as claimed in claim 1, wherein:
the average grain diameter Da is closer to an average grain diameter of a main component ceramic of a capacity region than the average grain diameter Db is; and
the capacity region is a region in which a set of internal electrode layers exposed to the first edge face of the multilayer structure face with another set of internal electrode layers exposed to the second edge face of the multilayer structure.

5. A manufacturing method of a multilayer ceramic capacitor comprising:
a first step of providing a pattern of a metal conductive paste on a green sheet including main component ceramic grains;
a second step of obtaining a ceramic multilayer structure by stacking a plurality of lamination units obtained by the first step so that positions of the pattern are alternately shifted; and
a third step of baking the ceramic multilayer structure and obtaining a multilayer structure in which each of a plurality of ceramic dielectric layers and each of a plurality of internal electrode layers are alternately stacked, the multilayer structure having a rectangular parallelepiped shape, the plurality of internal electrode layers being alternately exposed to a first edge face and a second edge face of the multilayer structure, the first edge face facing with the second edge face,
wherein:
in the third step, grain growth of a surface region of a side margin region is promoted more than grain growth of an inner region of the side margin region and thereby $1.5 \leq Db/Da \leq 10.0$ is satisfied in the side margin region when Da is an average grain diameter of a main component ceramic within 20 μm from an edge of the plurality of internal electrode layers in the side margin region in an extending direction of the plurality of internal electrode layers which extend, respectively, toward the side margin region and Db is an average grain diameter of the main component ceramic within 20 μm from a surface layer of the side margin region in the extending direction; and
the side margin region is a region that covers edge portions to which the plurality of internal electrode layers extend toward two side faces of the multiple structure other than the first edge face and the second edge face.

* * * * *